Feb. 23, 1943. G. NØRGAARD 2,311,771
APPARATUS FOR MEASURING GRAVITY
Filed Feb. 6, 1940
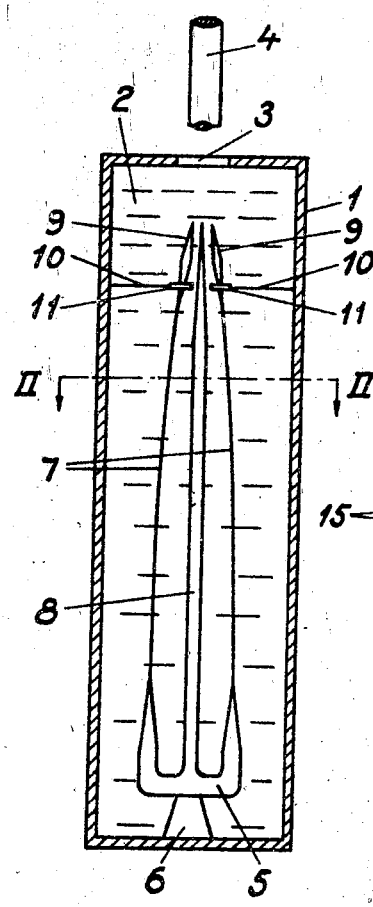
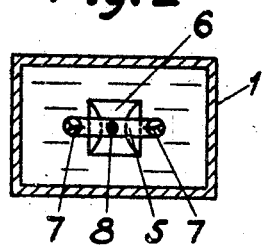
Inventor:
Gunnar Norgaard, Patented Feb. 23, 1943

2,311,771

UNITED STATES PATENT OFFICE 2,311,771

APPARATUS FOR MEASURING GRAVITY

Gunnar Nørgaard, Copenhagen-Kastrup, Denmark, assignor to Aktiebolaget Elektrisk Malmletning, Stockholm, Sweden, a company of Sweden Application February 6, 1940, Serial No. 317,599
In Sweden February 8, 1939

7 Claims. (Cl. 265—1.4)

The object of the present invention is an apparatus for measuring gravity, and more particularly for relative gravity measurements. Apparatus for such measurements have already been proposed which are based on the use of upright rod-like springs. However, the apparatus of this type as hitherto constructed have the disadvantage that they require a very accurate orientation relatively to the horizontal plane, whereby the measurements are rendered difficult where solid and steady ground for the mounting of the apparatus is not available. Another disadvantage in the known apparatus is their great sensitivity to vibration, whereby the measurements are rendered difficult or impossible in the proximity, for instance, of roads carrying a heavy traffic. Finally, the known apparatus had to be kept at a constant temperature by the use of complicated thermostat devices or by other means.

The invention has for its object to obviate these disadvantages. To this end, the apparatus according to the invention is distinguished by two or more filaments made of quartz or some other suitable resilient material, said filaments being connected at their lower ends to a basal body in a manner such that when the apparatus is arranged in its operative position, the filaments will take a nearly but not fully vertical position, so as to incline somewhat either toward or from each other, while the upper ends of the same are free, said filaments being surrounded by a liquid serving to damp the movement of the filaments, the apparatus including an indicating or observation device serving to determine the mutual position of the filaments.

Due to the fact that the filaments are so arranged as to incline somewhat either toward or from one another, an increase of the gravity will cause a decrease or an increase of the distance between the upper free ends of the filaments, while a reduction of the gravity will bring about an increase or a decrease of the said distance respectively. At different points of measurement, the gravity may thus be measured by measuring the distance between the upper ends of the filaments or the angle between the same.. By the use of two filaments at least the demands for the orientation of the apparatus relatively to the horizontal plane will be considerably smaller than in using the above-named previously known apparatus, inasmuch as a small inclination in an arbitrary direction does not alter to any appreciable extent the distance or the angle between the upright filaments. By reason of this a small error in the mounting of the apparatus has no appreciable influence on the results of measurement, and consequently the mounting may be effected more readily and rapidly than in using the previously known apparatus. In consequence, measurements may also be performed on loose ground, where the orientation of the apparatus relatively to the horizontal plane fluctuates on account of the absence of an entirely rigid mounting. Due to the fact that the resilient filaments are surrounded by a liquid, so strong a damping of the movements of the filaments will be obtained that gravity measurements may be performed also when the apparatus is subjected to vibration, for instance when it is mounted on a road carrying a heavy traffic.

Such damping may also be controlled by a suitable selection of the viscosity of the liquid. Moreover, the liquid serves to lead off disturbing electric charges, if any, and to bring about a temperature compensation more or less complete. Consequently, only a very simple thermostat device is required to keep the apparatus at an approximately constant temperature.

According to an alternative embodiment of the invention, it is possible to make use of four filaments i. e. two pairs secured to the basal body at some distance from each other in a manner such that the filaments are caused to converge in pairs toward their upper ends, the upper ends of the two filaments in each pair being connected with one another. By this means a greater stability of the apparatus in lateral direction is obtained.

The accompanying drawing illustrates two forms of embodiment of the invention by way of example.

Fig. 1 is a vertical longitudinal section through a measuring apparatus arranged in accordance with the invention, in which two filaments are used.

Fig. 2 is a horizontal section through the same apparatus on line II—II in Fig. 1.

Fig. 3 is a horizontal section through a modified embodiment, in which two pairs of filaments are used.

In the embodiment shown in Figs. 1 and 2, I designates a closed vessel of parallelopipedal shape, which may consist, for instance, of copper, and which is filled with a liquid 2. Provided in the upper wall of the vessel is a window 3, above which is arranged a measuring microscope 4. If desired, the vessel I may be inserted into a heat-insulating casing, and the liquid in the vessel may be kept at an approximately constant temperature, for instance by means of a thermostat device of any known construction. For example, the liquid may consist of a suitable watery solution, for instance of sugar, glycerin, gum arabic, or of oil, which has been made electrically conductive by some suitable admixture.

Provided in the vessel 1 is a basal body 5 made of quartz which is supported by a standard 6 secured to the bottom of the vessel, said body being bent upwardly at its ends and extended into two filaments 7. In this case, the body 5 and the filaments 7 are thus conceived as being integral, but the filaments 7 may also be made per se and fused, for example, to the ends of the quartz body 5. Furthermore, the basal body 5 carries a coarser straight quartz rod 8 which is arranged mid-way between the two filaments and is approximately of the same length as the latter and pointed at its upper end. In the case as illustrated, the filaments 7 are secured to the basal body in such a position as to incline somewhat toward each other.

At their upper free ends they are provided with enlargements 9 by which the filaments are loaded so that the gravity will cause a deflection of the filaments toward one another, as indicated in Fig. 1. An increase of the gravity will augment this deflection, so that the distance between the points of the two quartz filaments becomes less, and this distance, which may be established by means of the measuring microscope 4, consequently forms a measure of the gravity. The vertical adjustment of the apparatus is indicated by the points of the two filaments taking a symmetrical position relatively to the point of the quartz rod 8. Immediately below the enlargements 9 the two filaments are surrounded by small rings 11 carried by pins 10 secured to the walls of the vessel, these rings serving to limit the freedom of movement of the filaments to a few millimeters in horizontal direction. Otherwise, there is no special mechanism to arrest the filaments, and, therefore, the apparatus is always ready for transport and for being used for measurements. It being not necessary to arrest the filaments in the transport of the apparatus, the so-called elastic after-effect in disarresting the filaments is avoided, and the apparatus is thus in readiness for being read off already a few minutes after having been mounted at another measuring point.

The embodiment shown in Fig. 3 differs from that above described substantially in that the quartz body 12 serving as a basal body, which here, too, is carried by a standard 13 within the vessel 14 filled with liquid, carries four filaments 15 secured to the basal body at some distance from each other in such manner that the filaments will converge in pairs toward their upper ends, the upper ends of the two filaments in each pair being connected with one another. By this means the filaments will obtain greater stability in lateral direction (in a direction upwardly and downwardly in Fig. 3). Otherwise, this apparatus is arranged and operates in the same manner as that shown in Figs. 1 and 2.

The forms of embodiment described above and shown in the drawing are only to be regarded as examples and may obviously be further modified in a number of ways with respect to the details thereof, without departing from the principle of the invention. Thus, it will be possible, for example, also to establish the alterations of the angle between the two filaments 7 or between the two pairs of filaments 15 respectively by mirror reading. In this manner, the variations of said angle or of the distance respectively between the points of the filaments may then also be recorded continuously by photographic means on a moving strip of film. The filaments 7 and 15, which in practice may have a length of up to fifteen centimeters and a thickness of a few tenths of one millimeter, may also be made from some suitable metal, if desired.

I claim:

1. In an apparatus for measuring gravity, the combination of a base, two pairs of substantially vertical filaments of resilient material connected at their lower ends to said base, the filaments of each pair converging towards their upper ends and being connected to one another at said ends, the distance between said two pairs of filaments at their upper ends being different from the distance between said pairs of filaments at their lower ends, a vessel surrounding said base and said filaments, a liquid in said vessel in which said base and said filaments are immersed, and means for observing the relative position of the upper ends of said filaments.

2. An apparatus as claimed in claim 1, in which the distance between said two pairs of filaments at the upper ends thereof is less than the distance between said pairs of filaments at their lower ends.

3. An apparatus as claimed in claim 1, having a pointed upright rod extending vertically from said base, the two pairs of filaments being located on opposite sides of said rod and at substantially equal distances therefrom, and said filaments and said rod having substantially the same height over said base.

4. In an apparatus for measuring gravity, the combination of a base, a plurality of substantially vertical filaments of resilient material connected at their lower ends to said base, the upper part of said filaments being weighted forming astatized levers, said filaments being arranged in pairs with the upper ends of said filaments of each pair deviating from the vertical in opposite directions so that the distance between the upper ends of the filaments of each pair is different from the distance between the lower ends of said filaments, a vessel surrounding said base and said filaments, a liquid in said vessel in which said base and said filaments are immersed, and means for observing the relative position of the upper ends of said filaments.

5. In an apparatus for measuring gravity, the combination of a base, a plurality of substantially vertical and substantially parallel filaments of resilient material connected at their lower ends to said base, said filaments being arranged in pairs, the upper ends of said filaments of each pair deviating from the vertical in opposite directions so that the distance between the upper ends of the filaments of each pair is different from the distance between the lower ends of said filaments, said filaments being provided with weights at their upper ends forming astatized levers, the upper ends of said filaments forming indicators, means for observing the relative position of said indicators at the upper ends of said filaments, a vessel surrounding said base and said filaments, and a liquid in said vessel in which said base and said filaments are immersed.

6. An apparatus as claimed in claim 4, having a rod extending upwards substantially vertically from said base, the filaments of each pair being located on opposite sides of said rod and at substantially equal distances therefrom and said filaments and said rod terminating substantially at the same distance above said base, whereby the top of said rod provides a reference index for said filaments.

7. In an apparatus for measuring gravity, the combination of a base, a pair of substantially vertical filaments of resilient material connected at their lower ends to said base, weights attached to the upper ends of said filaments, thus forming astatized levers, the upper ends of said filaments deviating from the vertical towards one another so that the distance between said upper ends is less than the distance between the lower ends of the filaments, a vessel surrounding said base and said filaments, a liquid in said vessel in which said base and said filaments are immersed, and means for observing the relative position of the upper ends of said filaments.

GUNNAR NØRGAARD.